United States Patent [19]
Lee et al.

[11] Patent Number: 5,660,229
[45] Date of Patent: Aug. 26, 1997

[54] PLATE TYPE HEAT TRANSFER DEVICE

[75] Inventors: Yung Lee, Ontario, Canada; Hern Jin Park, Ansan-si, Rep. of Korea

[73] Assignee: Sunkyong Industries Co., Ltd., Suwon, Rep. of Korea

[21] Appl. No.: 999,380

[22] Filed: Dec. 31, 1992

[30] Foreign Application Priority Data

Apr. 22, 1992 [KR] Rep. of Korea ............ 92-6789

[51] Int. Cl.⁶ ........................................ F28D 15/00
[52] U.S. Cl. .................... 165/104.26; 165/104.21; 165/104.14
[58] Field of Search ............... 165/104.26, 104.21, 165/104.14

[56] References Cited

U.S. PATENT DOCUMENTS

| | | | |
|---|---|---|---|
| 2,350,348 | 6/1944 | Gaugler | 62/125 |
| 3,572,426 | 3/1971 | Edwards | 165/104.14 |
| 4,136,733 | 1/1979 | Asselman et al. | 165/104.26 |
| 4,770,238 | 9/1988 | Owen | 165/104.26 |

FOREIGN PATENT DOCUMENTS

| | | | |
|---|---|---|---|
| 95413 | 6/1982 | Japan | 165/104.14 |
| 220090 | 9/1988 | Japan | 165/104.14 |

Primary Examiner—John Rivell
Assistant Examiner—Christopher Atkinson
Attorney, Agent, or Firm—Cushman Darby & Cushman

[57] ABSTRACT

A plate type heat transfer device which has a number of rectangular or oval cavities (or cell) in its transverse cross-section, is charged with a certain amount of a working fluid in each of the cavities (or cells). Heat from the lower surface of the plate is transferred to the upper surface of the heat transfer device. The device has a wide range of application, such as for the stabilization or protection of foundation for pipelines roads, airport runways, structures, etc., by keeping the foundation intact in extremely cold regions, or to the ceilings or floors of relatively large spaces, such as office buildings, manufacturing factories, storage buildings, or even to the roofs of refrigerator cars where the temperature control is required.

7 Claims, 3 Drawing Sheets

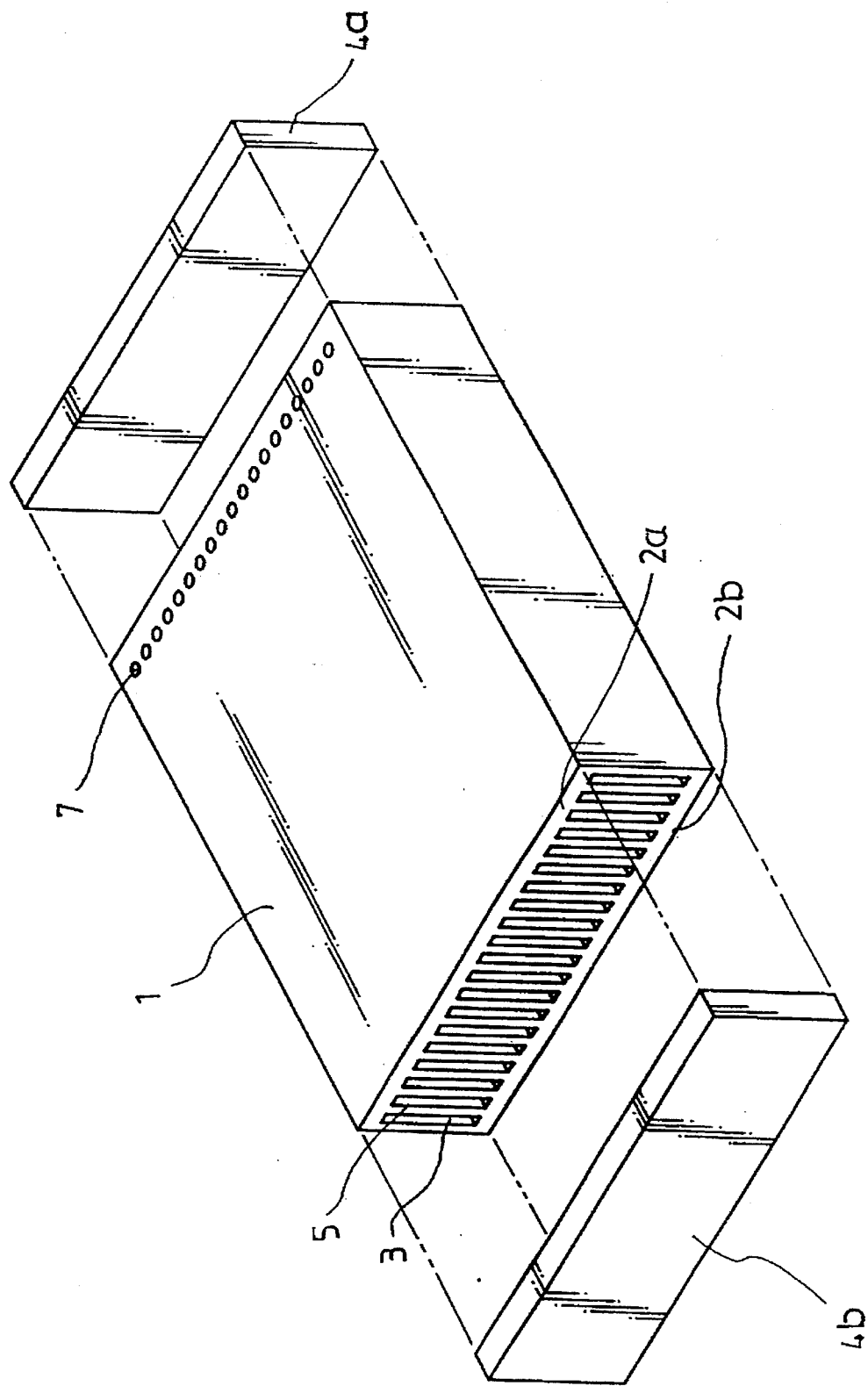

PLATE TYPE HEAT TRANSFER DEVICE

FIELD OF THE INVENTION

This invention relates to a plate type heat transfer device having a number of rectangular or oval cavities(or cells) in its cross-section which can be operated as a thermal rectifier or a plate of a uniform surface temperature. A certain amount of a working fluid is charged in each of the cavities as the heat transfer medium. The fluid transfers heat from the lower surface of the plate to the upper surface of the heat transfer device.

BACKGROUND OF THE INVENTION

The principle of this invention is that the fluid in the lower part of the cavities is vaporized by heat conducted through the lower surface of the heat transfer device. The vapor which moves up to the upper part of the cavities is then condensed by cooling at the upper surface of the heat transfer device and consequently the latent heat of vaporization is transferred to the outside through the upper surface of the cavities.

Heat is, therefore, transferred from the lower surface of the cavities by the evaporation of the working fluid to the upper surface of the cavities by the condensation of the vapor in the presence of gravity. Since heat can not be transferred from the upper surface of the heat transfer device to the lower surface of the device, it can act as a thermal diode.

When the fluid is condensed, it flows down along the walls of the cavities to the lower part of the cavities in the presence of a force field such as gravity because the density of the liquid phase of the working fluid is heavier than that of the vapor phase of the working fluid.

Therefore, when the plate type heat transfer device produced according to the present invention is installed in a place, heat is transferred only from the lower side to the upper side of the device and can not be transferred effectively in the reverse direction.

The heat transfer mechanism in the present invention employing the latent heat of vaporization of a working fluid is similar to that of the thermosyphon as described in U.S. Pat. No. 2,350,348.

However, because the structure of the heat transfer device by the present invention is quite different from that of the thermosyphon, the heat transfer route is different from that of the conventional thermosyphon. Conventional thermosyphons are made from tubings which have a relatively small area in the direction of heat flow due to the small diameter of the tubings used. In such conventional thermosyphons, heat is transferred into the tube through the side wall of the lower part of the tube containing the fluid and heat is removed through the side wall of the condensing part located in the upper part of the thermosyphon. Therefore, the conventional thermosyphon has disadvantages if it is to be applied to the situation where the area of heat transfer or the area which has to be maintained at a uniform temperature is relatively large in comparison to the area of the thermosyphon in the direction of heat flow.

SUMMARY OF THE INVENTION

The object of the present invention is to provide a plate type heat transfer device which absorbs heat at its lower surface and transfers heat out through its upper surface. The heat transfer device can be applied to a wide area of engineering practice with a high thermal efficiency.

One of the application of the proposed heat transfer device is a plate type "thermal diode" to be used for stabilization or protection of foundation for pipelines roads, airport runways, structures, etc., by keeping the foundation frozen in extremely cold regions. With a conventional thermosyphon, it requires a large number to achieve the same degree of thermal effectiveness as with the plate type heat transfer device of the present invention. Furthermore, for conventional thermosyphons, it is also required to have a part of the thermosyphon be exposed to the atmosphere.

With the plate type heat transfer device of the present invention which is completely buried in the ground, one plate can cover a large area of the road or the air field to keep the foundation frozen in extremely cold regions. Since there is no exposed part of the heat transfer device, the problem of the damage to the condensing section of the device, due to any number of causes, can be completely eliminated and thus the complete loss of heat transfer performance of the device can be avoided.

Another example for the application of the plate type heat transfer device of the present invention is to apply the device to the ceilings or floors of relatively large spaces, such as office buildings, manufacturing factories, storage buildings, or even to the roofs of refrigerator cars where the temperature control is required. The operating cost of the device in such application will be almost negligible compared to the conventional systems.

The present plate type heat transfer device can be manufactured by an extrusion or rolling process which is known to yield a high productivity. The conventional thermosyphon is generally made individually from metallic tubing, but the materials for the device by the present invention are not confined only to metals but also can be of many types of plastics.

As verified in the International Journal of Heat and Mass Transfer, Vol. 15, p.p. 1695–1707, the main thermal resistance which determines the thermal efficiency of a heat transfer system such as a thermosyphon which transfers heat utilizing the latent heat of vaporization of the working fluid is the heat transfer coefficients at the outer surface of the thermosyphon. Therefore, even when the device of the present invention is made of such plastics as polyethylene, polypropylene, etc., which have relatively low thermal conductivities compared to those of metals, the thermal efficiency of the device will suffer very little.

When plastics are to be used, the manufacturing process of the device of the present invention can be very similar to the extrusion process of metallic tubing production, which is a superior process to that of the present manufacturing method employed for the production of conventional thermosyphons. If the present device is to be made of metallic materials, roll forming, which is similar to that of the extrusion process employed for plastics, can be applied.

The working fluid to be charged in the present device can be such single component fluid as water, Freon 11, carbon dioxide, ammonium, ethanol, etc., depending on the practical condition of application.

For certain occasions, a two-component mixture of two fluids may show a superior engineering quality over that of single pure fluid. For example, a working fluid of water and ethanol, or water and ethyleneglycol in the heat transfer device of the present invention may suit better for cold region applications.

It has been the practice with the conventional thermosyphon to use water is as the working fluid for the range of temperature above the freezing point of water at a pressure near atmospheric. For the temperature range below the freezing point of water, a single component fluid such as Freon 11, carbon dioxide, ammonium or ethanol, which are relatively expensive in comparison to water, is used. In the heat transfer device of the present invention, a mixture of water and ethanol, or water and ethyleneglycol is preferred for use as the working fluid for the application in cold regions, instead of such expensive single component fluids as mentioned above, which makes the device further cost effective.

BRIEF DESCRIPTION OF THE DRAWINGS

The present invention will now be described with the help of the accompanying drawings, in which:

FIG. 1 is an exploded perspective view of the heat transfer device of the present invention.

DETAILED DESCRIPTION OF THE INVENTION

Figure 2A:
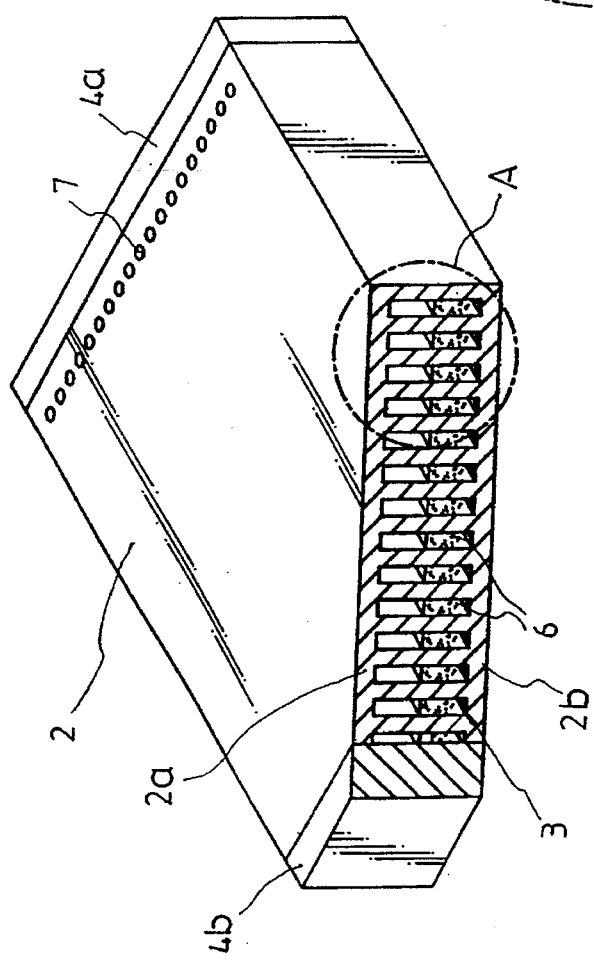
FIG. 2A is an assembled perspective view of the heat transfer device of FIG. 1 with a portion cut away and sectioned to show the inner construction of the present heat transfer device.
Figure 2B:
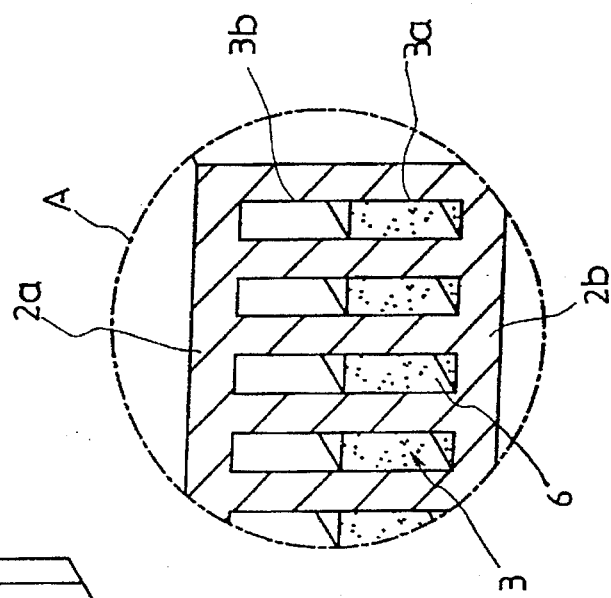
FIG. 2B is an enlarged view of the circled region "A" designated in FIG. 2A.

Referring to the drawings (FIGS. 1 and 2) wherein reference numbers refer to elements and parts, the plate type heat transfer device 1 of this invention is comprised of the main plate 2 having a number of heat transfer cells(cavities) 3 which are extended in parallel along the main plate 2, and two end plates 4a and 4b which close off the heat transfer cells 3 in the main plate 2 by covering the left and right ends of the main plate 2.

Each heat transfer cell 3 is from transversally neighboring ones or the exterior of the device by vertical partitions 5 which extend between the upper wall 2a of the main plate 2 and the lower wall 2b of the main plate 2.

A predetermined amount of a working fluid 6 is charged under vacuum into each heat transfer cell 3 through the charging ports 7 located on the upper wall 2a of the main plate 2.

Figure 3:
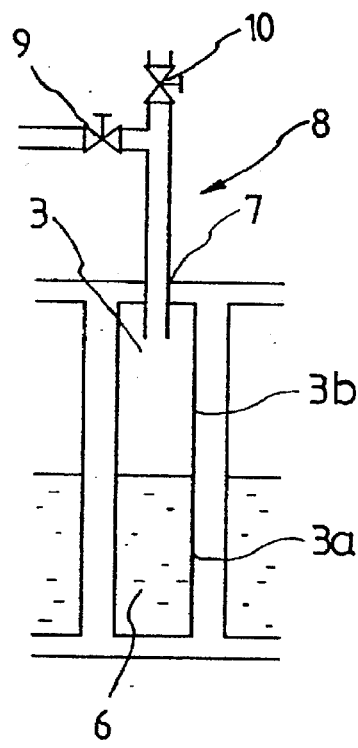
FIG. 3 illustrates a process for charging working fluid into a cavity which makes up a cell in the present heat transfer device.

The working fluid 6 is charged into the heat transfer cell 3 by means of a working fluid charging apparatus 8 which has a vacuum line 9 and a working fluid charging line 10 as shown in FIG. 3. The inert gas or air in the cell 3 is evacuated through the vacuum line 9 of the working fluid charging apparatus 8 which is connected to the charging ports 7. The vacuum line 9 is then closed and the working fluid charging line 10 is opened so that a working fluid is sucked into the cells 3. Working fluid 6 of a fraction of the volume of the heat transfer cell 3 is charged in each cell 3. Consequently, a liquid phase 3a and a gas phase 3b of the working fluid 6 coexist in the cell 3.

When the charging process of the working fluid 6 is completed, the working fluid charging apparatus 8 is removed from the charging port 7, which is then sealed.

The working fluid 6 charged in the cells 3 can be either a single component fluid such as water, Freon 11, carbon dioxide, ammonium, ethanol, etc., or a two-component mixture of two fluids such as water and ethanol, or water and ethyleneglycol, depending on the condition of application.

The main plate 2 can be produced by an extrusion process from plastics, or by an roll forming process from metallic materials. The width, or and length of the main plate 2 will be determined by the application of the device.

The plate type heat transfer device 1 of the present invention transfers heat from the lower wall 2b to the upper wall 2a of the main plate 2. The working fluid in the lower part is vaporized by heat from the lower wall 2b of the main plate 2. The vapor moves up through the cell 3 and is then condensed by cooling in the upper wall 2a of the cell 3 and the latent heat of vaporization of the working fluid is transferred to the outside through the upper wall 2a of the cell 3. The condensate returns to the lower part of the cell 3 and the process repeats continuously. Heat is, therefore, transferred from the lower part of the plate 1 to the upper part of the plate 1 without any additional or external aid to transfer heat.

Since the plate 1 is modular structurally, the plate 1 can be so manufactured that a wide area such as highway or airport runway can be covered by simply connecting these modules in tandem or in parallel.

Figure 4:
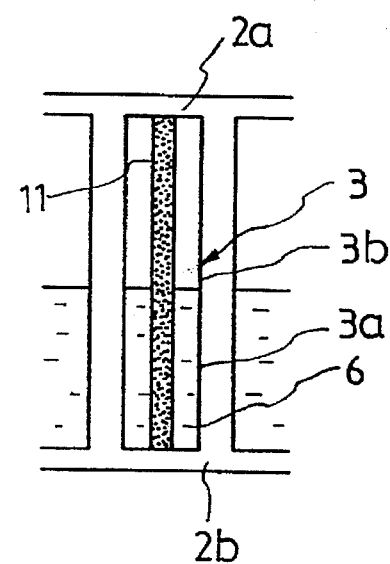
FIG. 4 is a cross-sectional view of a second embodiment of the heat transfer cell of the present invention.

FIG. 4 is the cross-sectional view of the heat transfer cell 3 of the present invention based on a different design concept. The wick 11 is vertically placed in the cell 3 from the upper wall 2a to the lower wall 2b. The use of the wick 11 in the present cell 3 is based on the principle of the conventional heat pipes. The cell 3 with the wick 11 can be used even in situations where there is no force field such as gravity.

Figure 5:
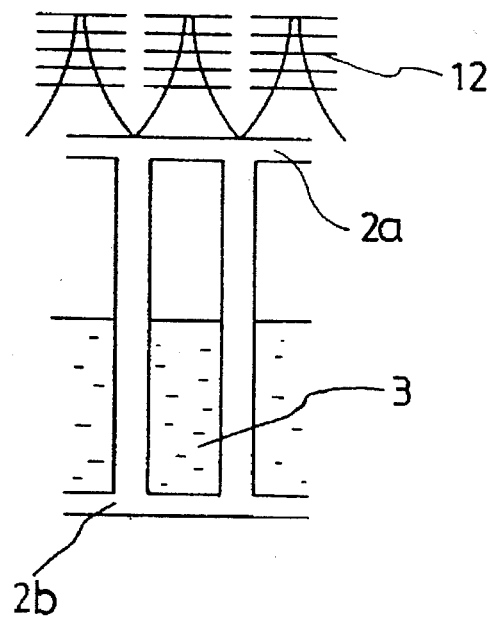
FIG. 5 is a cross-sectional view of an exemplary assembly for a practical application of the heat transfer device of the present invention.

FIG. 5 is a cross-sectional view of an assembly of another example of a practical application of the present heat transfer device. Fins 12 are attached on the upper outer surface of the heat transfer plate 1 so as to increase the thermal efficiency of the heat plate 1 when the fins 12 are exposed to air.

What is claimed is:

1. A plate-type heat transfer device, comprising:

a first plate and a second plate, said plates being juxtaposed in spacedly confronting relation, so as to have an inner face and an outer face with a space defined between them, a plurality of parallel partition walls, each of which along one longitudinal margin thereof is integrally connected with the inner face of one of said plates and each of which along an opposite longitudinal margin thereof is integrally connected with the inner face of the other of said plates, said partitions thereby dividing said space into a plurality of transversally adjacent cells, each having two longitudinally opposite ends;

said first and second plates and said partition walls constituting a unitary structure integrally extruded of synthetic plastic resin;

two end plates engaging said plates and said partition walls respectively at opposite ends of said cells and thereby closing said ends of said cells;

each said cell being greater in linear extent between said plates than in linear extent between the respective ones of said partitions which define that cell;

each cell being partially filled with a given-quantity charge of vaporizable liquid working fluid, said heat transfer device being oriented horizontally, with said second plate overlying said first plate so that said first plate is in contact with said liquid working fluid and said second plate defines part of a respective headspace in each said cell.

2. The plate-type heat transfer device of claim 1, further including:

at least one wick disposed in each said cell so as to extend from one said plate to the other said plate, for wicking said working fluid from one said plate towards the other said plate.

3. The plate-type heat transfer device of claim 1, further including:

heat rejecting fins provided on said outer surface of one of said plates.

4. The plate-type heat transfer device of claim 1, wherein:

said vaporizable liquid working fluid is a single component fluid selected from the group consisting of water, Freon 11, carbon dioxide, ammonium, and ethanol.

5. The plate-type heat transfer device of claim 1, wherein:

said vaporizable liquid working fluid is a two-component mixture selected from the group consisting of water-ethanol, and water-ethylene glycol.

6. The plate type heat transfer device of claim 1, further including:

means defining a plurality of closable ports through one of said plates into respective ones of said cells, for charging said cells with respective quantities of said working fluid.

7. The plate-type heat transfer device of claim 1, wherein:

said plates are rectangular and are longer longitudinally of said cells than each of said cells is wide; and each of said cells is substantially rectangular or oval in transverse cross-sectional shape.

* * * * *